(12) United States Patent
Hetherington (10) Patent No.: US 7,124,522 B2
(45) Date of Patent: Oct. 24, 2006

(54) CULTIVATING TOOL AND APPARATUS INCORPORATING SAME

(76) Inventor: Donald A. Hetherington, 4907 Norfolk Street, Burnaby, BC (CA) V5G 1E9

( * ) Notice: Subject to any disclaimer, the term of this patent is extended or adjusted under 35 U.S.C. 154(b) by 423 days.

(21) Appl. No.: 10/382,777

(22) Filed: Mar. 6, 2003

(65) Prior Publication Data
US 2004/0068895 A1    Apr. 15, 2004

(30) Foreign Application Priority Data
Oct. 9, 2002   (CA) .................... 2407181

(51) Int. Cl.
*A01G 23/06*   (2006.01)
*E02F 3/96*    (2006.01)

(52) U.S. Cl. ............................ 37/404; 144/334

(58) Field of Classification Search ........... 37/301, 37/302, 403, 404; 30/134; 294/106; 144/24.12, 144/334; 241/101.73
See application file for complete search history.

(56) References Cited

U.S. PATENT DOCUMENTS

| | | | |
|---|---|---|---|
| 1,391,131 A | 9/1921 | Lynch et al. | |
| 1,633,057 A | 6/1927 | Wold | |
| 1,919,075 A | 7/1933 | Rasmussen | |
| 2,083,750 A | 6/1937 | Tennigkeit | 97/207 |
| 2,128,077 A | 8/1938 | Custer | 97/52 |
| 2,528,170 A | 10/1950 | Peacock | |
| 2,593,341 A | 4/1952 | Phipps | 97/52 |
| 2,934,108 A | 4/1960 | Bles | |
| 2,966,180 A | 12/1960 | Bles | |
| 3,620,271 A | 11/1971 | Loyer | 144/309 |
| 3,812,920 A | 5/1974 | Green | 172/350 |
| 3,842,871 A | 10/1974 | Jureiwicz | 144/193 |
| 3,959,900 A * | 6/1976 | Luck | 37/404 |
| 4,094,348 A | 6/1978 | Wolf | 144/34 |
| 4,130,037 A | 12/1978 | Matthews | 83/56 |
| 4,586,258 A | 5/1986 | Burke | 30/308.1 |
| 4,682,638 A | 7/1987 | Becker | 144/34 |
| 5,285,855 A | 2/1994 | Bojar | 172/377 |
| 5,316,088 A | 5/1994 | Ries | 172/510 |
| 5,398,360 A | 3/1995 | Alexander | 7/158 |
| 5,921,302 A * | 7/1999 | Petersen | 144/334 |
| 5,933,346 A | 8/1999 | Brabec et al. | 364/167.07 |
| 6,076,572 A * | 6/2000 | Cook | 144/24.12 |
| 6,092,255 A | 7/2000 | Kim | 15/121 |
| 6,213,287 B1 | 4/2001 | Juracko | 198/499 |
| 6,308,440 B1 * | 10/2001 | Mueller | 37/404 |

* cited by examiner

*Primary Examiner*—Robert E Pezzuto
(74) *Attorney, Agent, or Firm*—Moore & Van Allen PLLC; Michael G. Johnston (57) ABSTRACT

A cultivating tool for breaking up and spreading plant material over and into the ground has opposed ends and upper, lower and intermediate portions extending longitudinally between the ends. The lower portion includes a cutting edge. The intermediate portion includes a forward outer surface extending concavely upwardly and forwardly from the lower portion to the upper portion and a rearward outer surface extending concavely upwardly and rearwardly from the lower portion to the upper portion. Cultivating apparatus includes the tool coupled to the end of a support arm. The arm may be an articulated arm and the coupling may be a pivotal coupling.

14 Claims, 7 Drawing Sheets

CULTIVATING TOOL AND APPARATUS INCORPORATING SAME

FIELD OF THE INVENTION

The present invention relates to cultivating tools and apparatus. More particularly, the present invention relates to tools and apparatus for breaking up tree stumps and other plant material, driving broken up material into the ground, and scraping and grading the ground.

BACKGROUND TO THE INVENTION

When forested land is harvested, tree stumps, branches and other plant debris remain in or on the harvested ground. To recultivate the debris must be either removed or worked around.

Often, stumps and other debris are fragmented and removed with equipment developed for other purposes, such as bulldozers, backhoes, excavators and the like. However, such equipment is primarily designed for digging into or smoothing out a ground surface and, although able to do so, is not well adapted to efficiently crush, fracture or otherwise fragment large items such as stumps, branches and the like into smaller pieces and mix or turn them back into the ground where they are biodegradable. If the remains of harvested trees are not effectively fragmented or are simply removed from the ground, decay of the wood and recycling of minerals and other nutrients back into the soil can be impaired or prevented.

Similarly, known equipment that is basically dedicated to the task of breaking up tree stumps and other plant material is not well adapted to subsequently work debris into the ground or to prepare the ground for cultivation by scraping or grading operations.

There is therefore a need for a single device specifically adapted to fracture, pound, or otherwise fragment stumps and the like, and to also effectively separate the fragments so formed and turn them into the ground and to perform these functions on a large scale.

SUMMARY OF THE INVENTION

In a broad aspect of the present invention there is provided a cultivating tool comprising opposed ends and upper, lower and intermediate portions extending longitudinally between the ends. The lower portion comprises a cutting edge extending between the ends. The intermediate portion extends between the upper and lower portions, and comprises firstly a forward outer surface extending between the ends and concavely upwardly and forwardly from the lower portion to the upper portion and, secondly, a rearward outer surface extending between the ends and concavely upwardly and rearwardly from the lower portion to the upper portion.

The cutting edge, complemented by the forward and rearward concave surfaces of the tool, is particularly suitable for splitting or fracturing plant material such as tree stumps and branches. As well the tool can be driven into and work the ground while mixing broken up plant material into the ground in the process. Moreover, and again by reason of its concave forward and rearward surfaces, the tool is particularly suitable for bi-directional ground scraping and grading operations, and for spreading concentrations of plant material over the ground.

In another aspect of the present invention, there is provided cultivating apparatus which includes a vehicle and an articulated arm in combination with a cultivating tool as described above. The articulated arm comprises a boom pivotally mounted to the vehicle and extending outwardly therefrom for pivotal movement about a first axis; and a stick connected to the boom. The stick extends from a proximal end pivotally connected to an outward end of the boom to a distal end of the stick, and is connected to the boom for pivotal movement about a second axis extending substantially parallel to the first axis. The tool is coupled to the distal end of the stick, and is preferably pivotally coupled for pivotal movement about a third axis extending substantially parallel to the above mentioned first and second axes with the cutting edge of the tool extending substantially parallel to all three axes. Most preferably, the tool is pivotable to a position where it extends from the stick substantially in line with the stick. Such an arrangement not only enables full advantage to be taken of the ground scraping and grading characteristics of the tool but also enables the tool to be used most effectively for operations such as splitting a tree stump or driving the tool into the ground.

The foregoing and other features and advantages of the present invention will now be described with reference to the drawings.

DETAILED DESCRIPTION OF INVENTION

Figure 1:
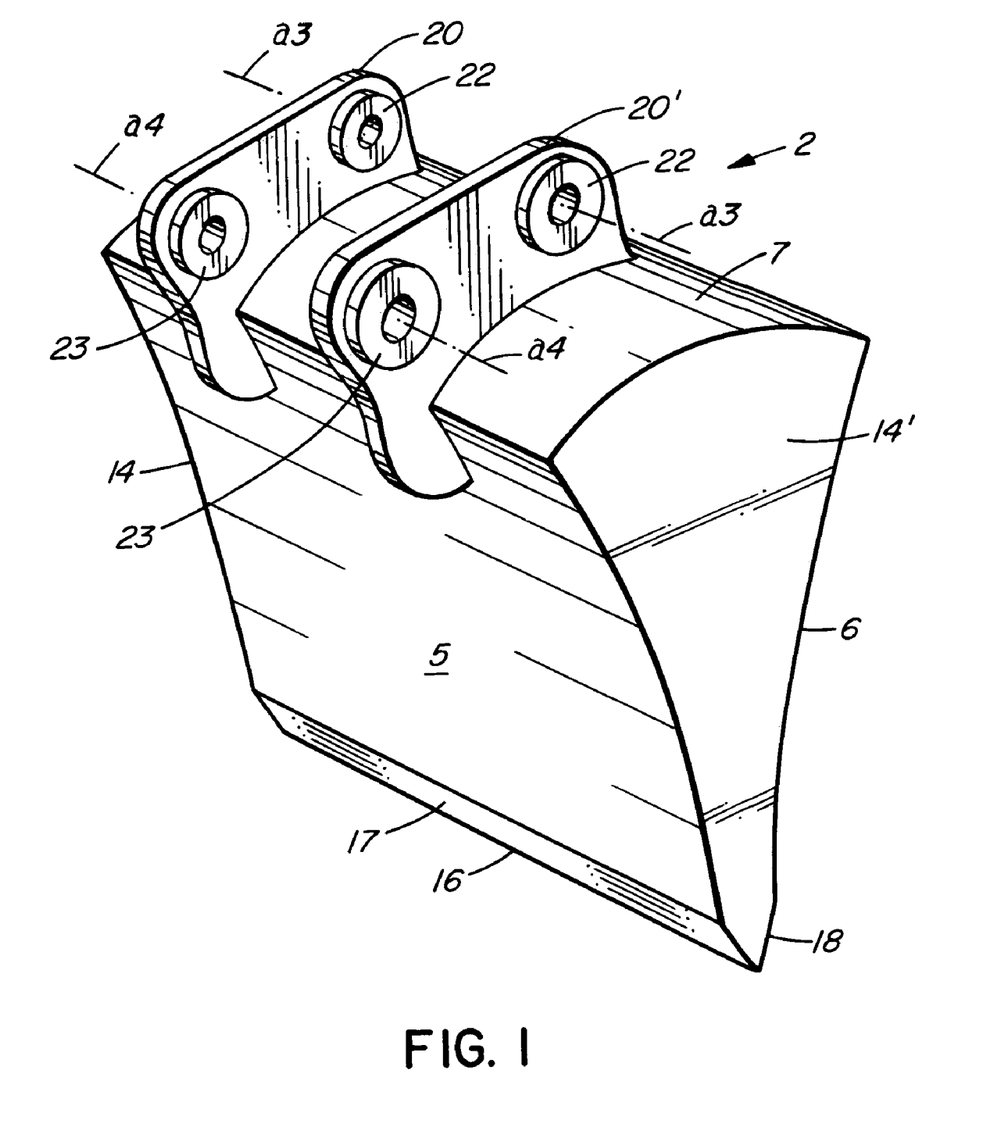
FIG. 1 is a perspective view of a cultivating tool in accordance with the present invention.
Figure 2:
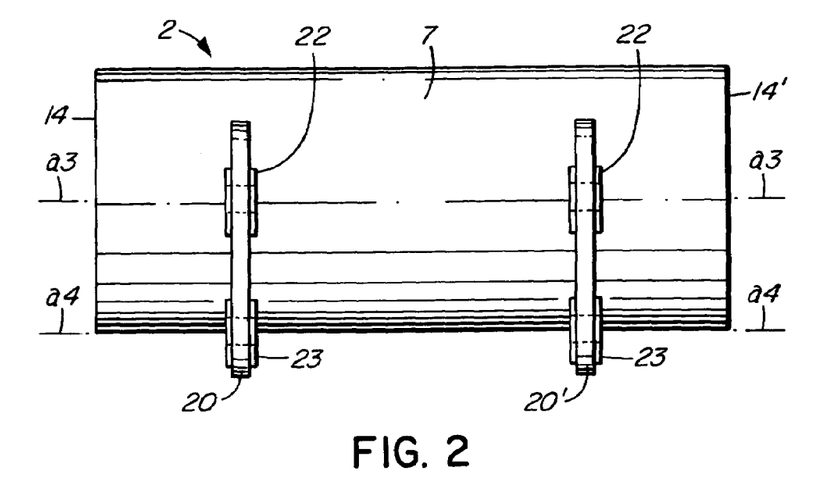
FIG. 2 is a top view of the tool shown in FIG. 1.
Figure 3:
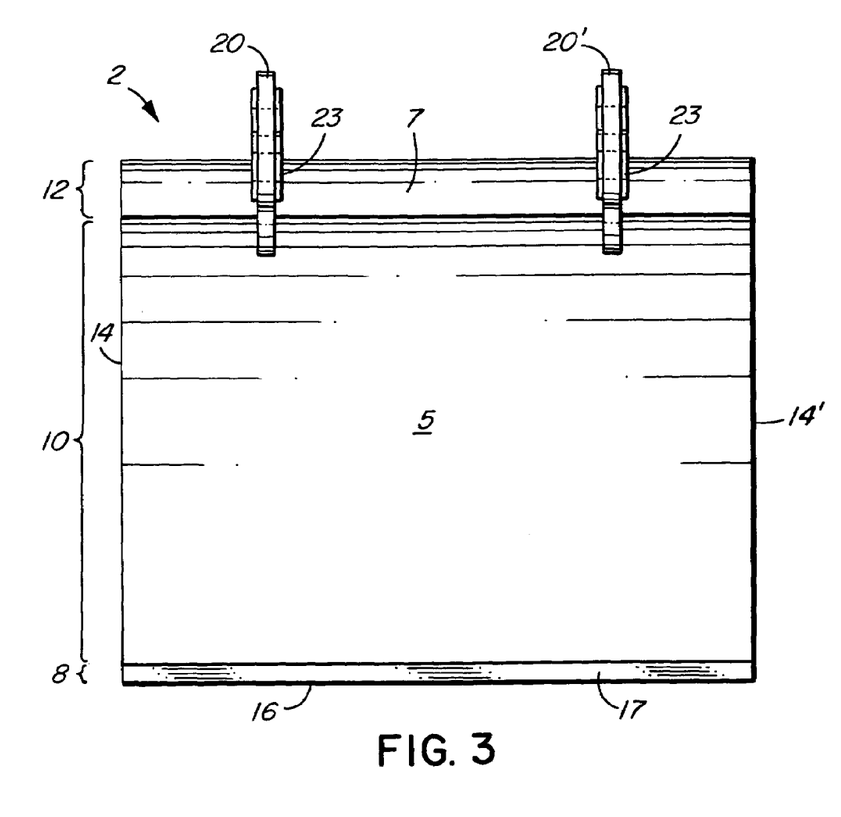
FIG. 3 is a front elevation view of the tool shown in FIG. 1.
Figure 4:
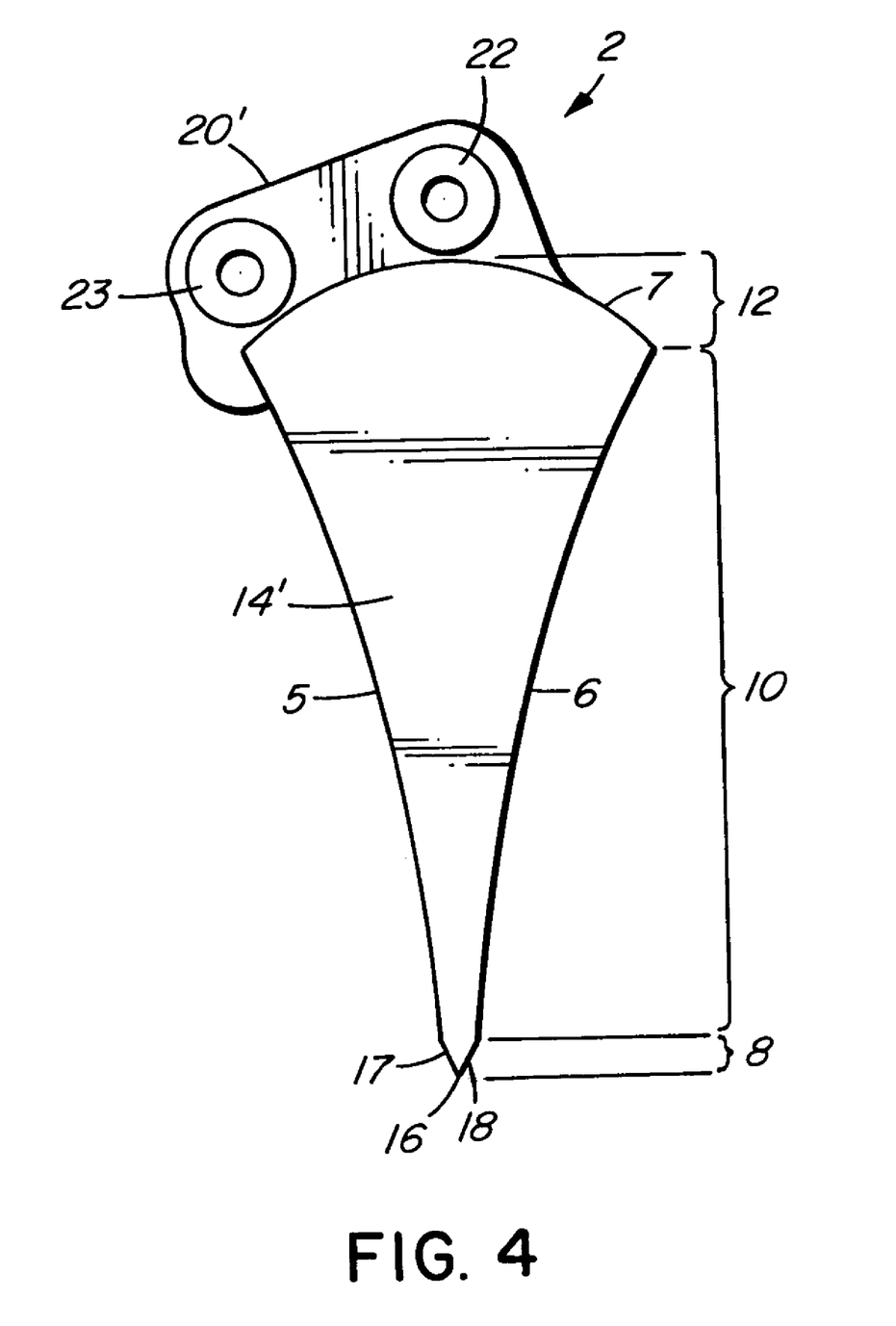
FIG. 4 is an end elevation view of the tool shown in FIG. 1

Referring now to FIGS. 1–4 with initial attention on FIGS. 3–4, there is shown a tapered or wedge-shaped cultivating tool generally designated 2 which comprises a lower portion 8, an intermediate portion 10, and an upper portion 12, all of which portions extend longitudinally between opposed, flat ends or end surfaces 14, 14' of the tool. Lower portion 8 includes a cutting edge 16 extending longitudinally between ends 14, 14', a generally flat forward surface 17 extending upwardly and forwardly from edge 16 to intermediate portion 10, and a generally flat rearward surface 18 extending upwardly and rearwardly from edge 16 to intermediate portion 10. Intermediate portion 10 extends between upper and lower portions 8, 12 and includes both a forward outer surface 5 which extends between ends 14, 14' and concavely upwardly and forwardly from lower portion 8 to upper portion 12, and a rearward outer surface 6 which likewise extends between ends 14, 14' and concavely upwardly and rearwardly from lower portion 8 to upper portion 12. Upper portion 12 includes a trailing end 7.

Tool 2 also includes a pair of spaced mounting brackets 20, 20' which preferably are welded to the positions shown. Each bracket includes a pair of pin bosses 22, 23. Boss 22 of bracket 20 is axially aligned along axis a3 with boss 22 of bracket 20'. Likewise, boss 23 of bracket 20 is axially aligned along axis a4 with boss 23 of bracket 20'. By means of brackets 20, 20', tool 2 is releasably and pivotally couplable to a support arm such as the stick portion of a mechanical arm in the manner described below. Apart from brackets 20, 20', tool 2 is substantially symmetric on either side of an imaginary vertical plane containing cutting edge 16.

In a currently preferred embodiment, tool 2 is fabricated from steel and has an overall length (between ends 14, 14') and height of about 6 by 5 feet. The maximum thickness of the tool between outer surfaces 5, 6 is about 2½ feet. Trailing end 7 is given a convex shape to facilitate mounting of the tool to the stick of a conventional excavating machine as described below, including the use of commercially available mounting brackets 20, 20' normally used to mount a conventional excavating bucket (not shown) to the stick.

Figure 5:
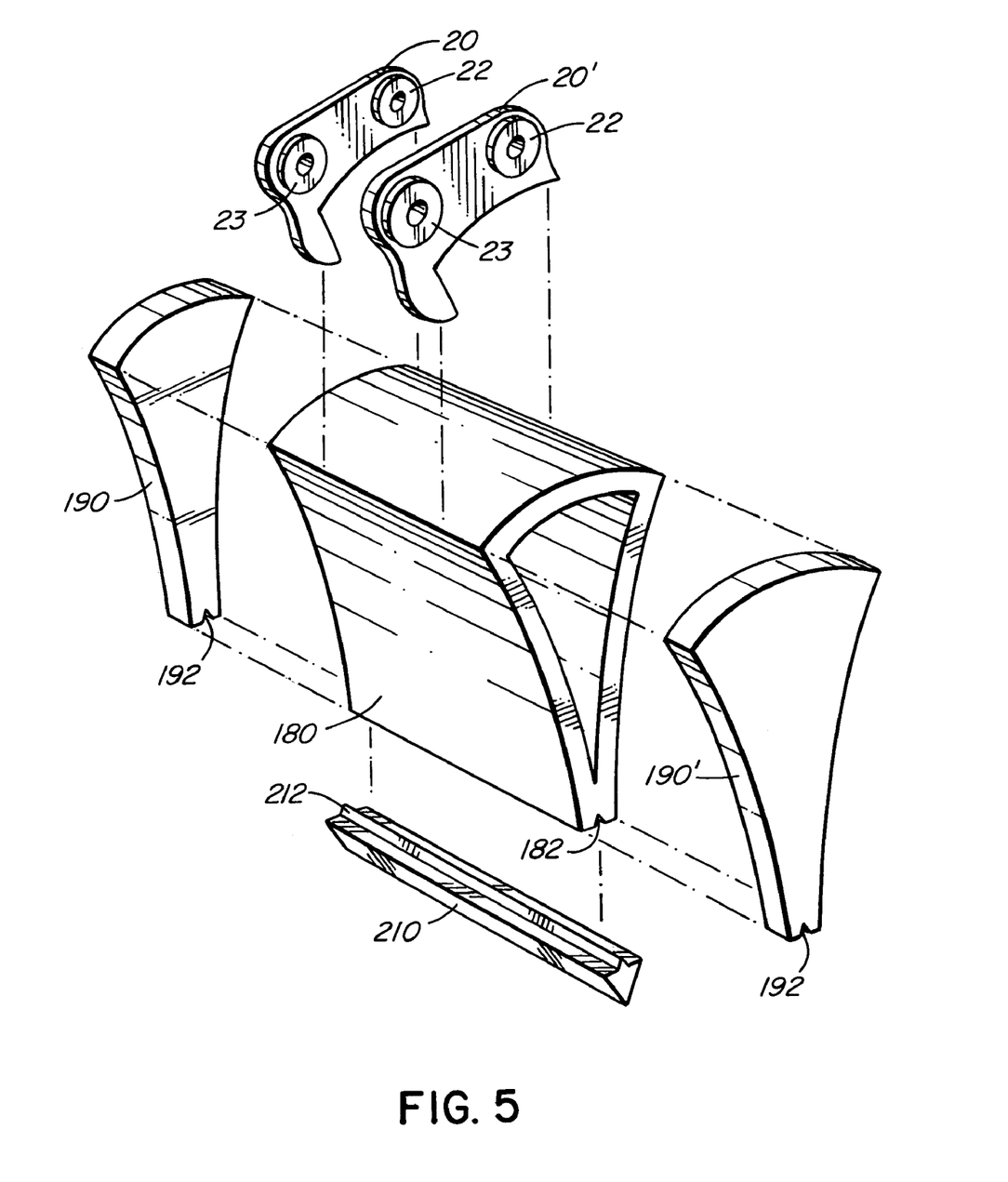
FIG. 5 is a partially exploded perspective view illustrating the assembly of a cultivating tool having the outward shape of the tool shown in FIG. 1.

A cultivating tool having the outward shape of the tool shown in FIG. 2 may be readily assembled from part segments. One possible breakdown of parts and their manner of assembly is illustrated in FIG. 5. The parts are fabricated from steel.

In FIG. 5, there is shown in addition to mounting brackets 20, 20' a shaped, hollow module 180 which includes a longitudinally extending centrally positioned groove 182 in its lower surface, a pair of opposed end plates 190, 190' which each include a groove 192 that aligns with groove 182, and a rail section 210 which includes a longitudinally extending tongue 212 centrally positioned on its upper surface. The shape of end plates 190, 190', matches the cross section of module 180. The hollowing of module 180 serves to substantially reduce overall weight while still providing a rugged implement.

The length of rail section 210, including tongue 212, corresponds to the length of module 180 plus the combined wall thicknesses of end plates 190, 190'. Tongue 212 is sized to slidingly fit within grooves 182 and 192. While the use of the tongue and groove arrangement is certainly not considered to be essential, it is considered to provide added strength and it does assist to align the various parts during assembly.

When the exploded parts shown in FIG. 5 are brought together, the overall structure generally becomes that of tool 2 shown in FIG. 1. More particularly, rail section 210 embodies lower portion 8 of tool 2 as shown in FIGS. 3–4. The lowermost part of rail section 210 corresponds to cutting edge 16. Further, the convex upper surfaces of module 180 together with the corresponding upper surfaces of end plates 190, 190' will define trailing end 7 as shown in FIG. 1. As well, the concave forward and rearward outer surfaces of module 180 together with the corresponding concave forward and rearward outer surfaces of end plates 190, 190' will define forward and rearward outer surfaces 5, 6 as shown in FIG. 1. Overall, module 180 together with end plates 190, 190' thus will be seen to substantially define intermediate and upper portions 10, 12 of tool 2 as shown in FIG. 1.

The various exploded parts shown in FIG. 5 are assembled by welding. At least in the case of rail section 210, it is preferably attached with a welding composition having a melting point lower than that of the parts being welding. Then, if rail section 210 becomes degraded by wear and tear or other damage, it can readily be replaced with a new rail section. As such, it can be considered as being releasably attachable to the intermediate portion of the overall tool.

It will be appreciated by those skilled in the art that the part segments shown in FIG. 5 are merely exemplary and that a cultivating tool similar to that shown in FIG. 1 could be assembled from differently configured parts. Further, it will be appreciated that the parts that are utilized may be adjoined by various means other than welding—for example: bolts, screws, rivets and/or the like.

Figure 6:
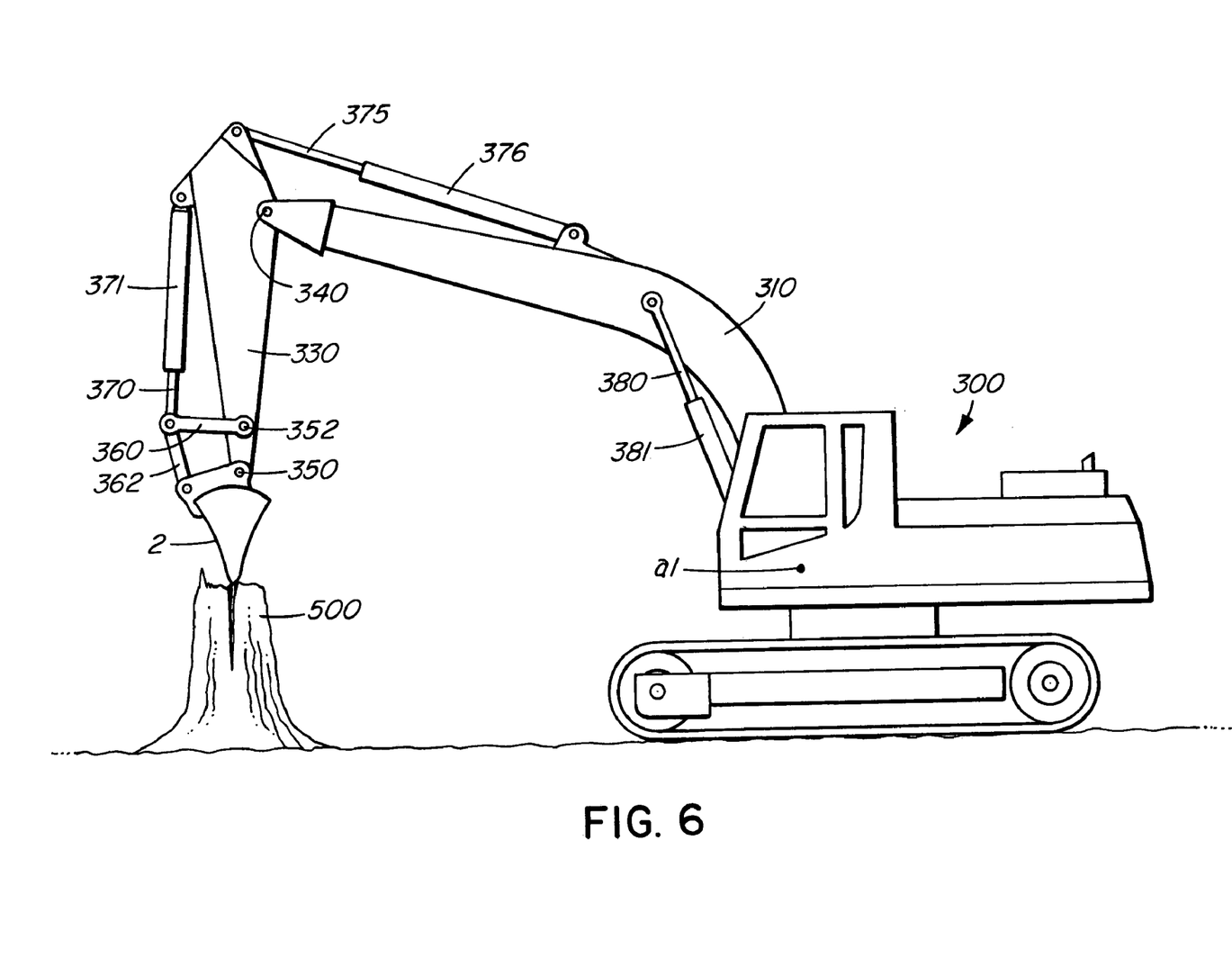
FIG. 6 is a side elevation view of cultivating apparatus in accordance with the present invention when being used to fracture a tree stump. The apparatus includes the cultivating tool shown in FIG. 1.
Figure 7:
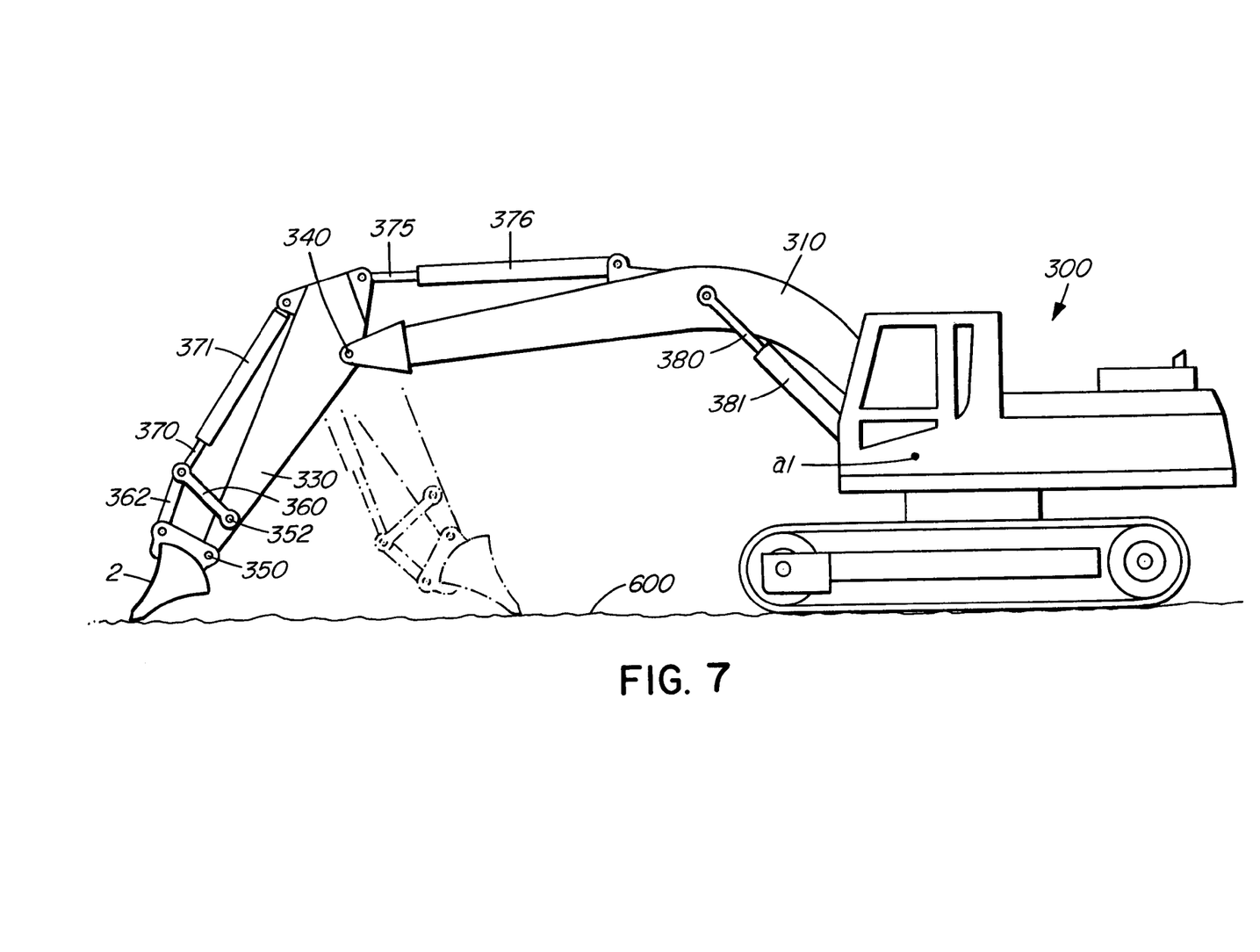
FIG. 7 is a side elevation view of the cultivating apparatus shown in FIG. 6 when being used to scrape or grade a ground surface.
Figure 8:
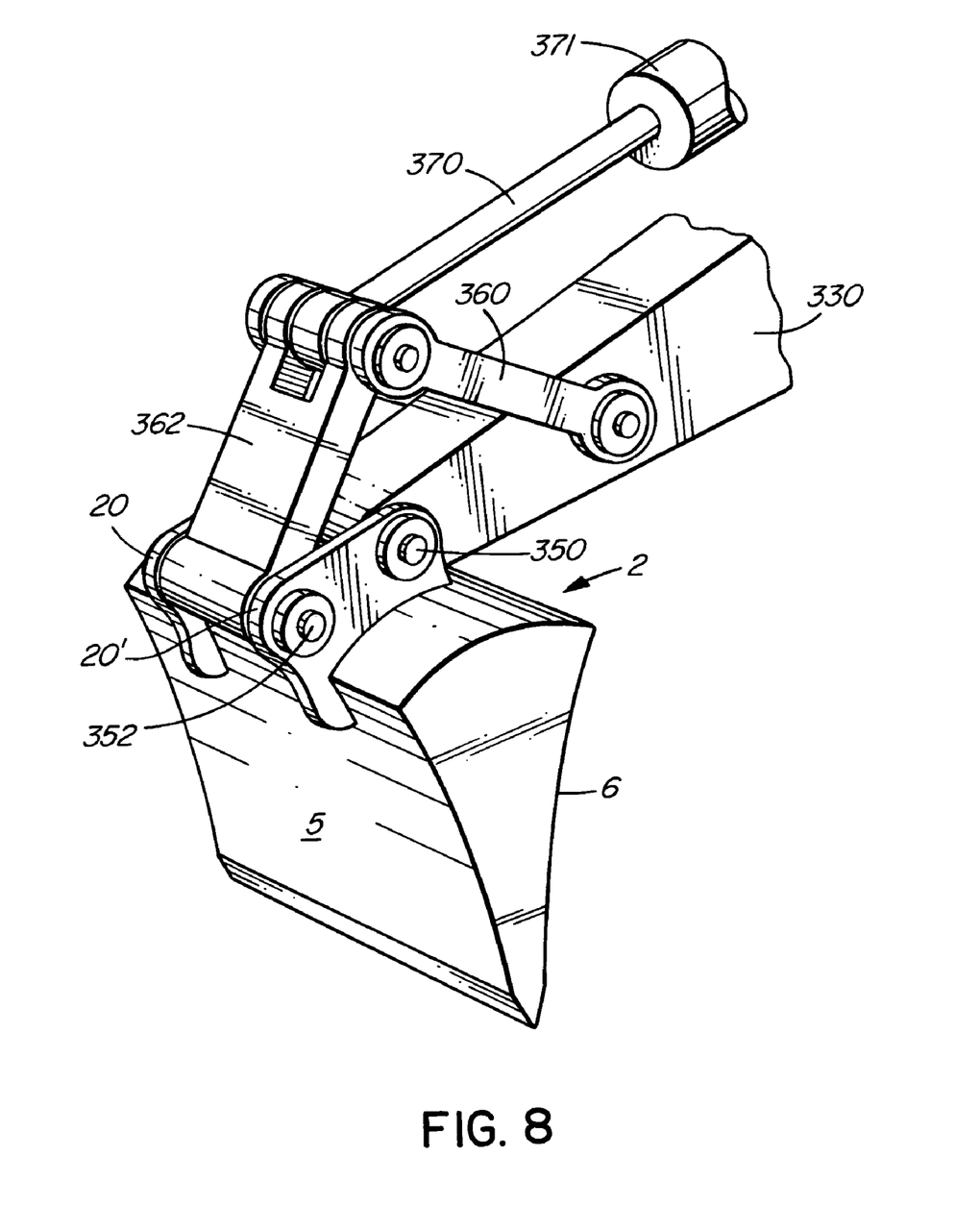
FIG. 8 is a perspective view, partially cut-away, showing in more detail how the tool shown in FIG. 1 is coupled in the apparatus shown in FIGS. 6–7.

Referring now to FIGS. 6–8 there is shown cultivating apparatus which includes a vehicle (viz. a conventional excavator tractor) generally designated 300, a boom 310 pivotally mounted to the vehicle at a position hidden from view and extending outwardly therefrom for pivotal movement about an axis approximately at point a1, and a stick 330 extending from a proximal end pivotally connected by pivot pin 340 to an outward end of boom 310 for pivotal movement about the axis of pin 340. Stick 330 extends from the proximal end to a distal end where cultivating tool 2 is pivotally connected by pivot pins 350, 352 and conventional pivot links 360, 362 for pivotal movement about the axis of pin 350. It will be noted that the axis of pin 340, the axis of pin 350 and the axis through point a1 all run in parallel. As well, the cutting edge of tool 2 extends substantially parallel to these axes.

Although there are a range of possibilities, it should be noted that the particular manner in which tool 2 is coupled to vehicle 300 is widely used for the mounting of excavator buckets to vehicles such as vehicle 300 and to other vehicles such as back hoes and the like.

In the embodiment illustrated in FIGS. 6–8, the angular or pivot position of cultivating tool 2 relative to stick 330 is controlled and varied in a conventional manner by linear movement of cylinder rod 370 driven by hydraulic cylinder or actuator 371. Further, the angular or pivot position of stick 330 relative to boom 310 is controlled and varied in a conventional manner by linear movement of cylinder rod 375 driven by hydraulic cylinder or actuator 376. Finally, the angular or pivot position of boom 310 relative to vehicle 300 is controlled and varied in a conventional manner by linear movement of cylinder rod 380 driven by hydraulic cylinder or actuator 381. Such controls enable the position and movement of tool 2 to be fully controlled for various purposes.

The use of tool 2 to split or fracture material (in this case a tree stump 500) is illustrated in FIG. 6. To achieve optimum effect, the tool is pivoted to a generally vertical position extending substantially in line with stick 330 which is also pivoted to a generally vertical position. In this position, the tool can be pounded on stump 500 not only with its own weight and momentum but also with that of stick 330, and with forces transmitted to stick 330 and the tool from boom 310.

The use of tool 2 to spread material such as broken up plant debris is illustrated in FIG. 7. Here, cutting edge 16 of the tool is positioned on or proximate to ground surface 600 and the tool is moved backward from the solid line position shown in FIG. 7 or forward from the broken line position shown in FIG. 7. During such movements, some debris can slip under the cutting edge while other debris, depending on the direction of movement, travels up and cascades down from the rearward or forward concave outer surface of the tool. For such operations, users in most cases are apt to find that better results can be achieved if tool 2 is pivoted to an angle between about 30 and 60 degrees from the plane of the ground surface rather than to a vertical position as shown in FIG. 6.

It will be apparent to those skilled in the art that a cultivating tool in accordance with the present invention need not be constructed in a modular fashion though this is presently considered to be the most convenient construction method. A solid, heavier tool could also be used, and a range of breakdown structures other than that depicted in FIG. 5 are possible. Further, the design of the mounting assembly, the form and attachment of mounting brackets, the movement and articulation of the tool on a support arm can be varied in numerous ways. Many such variations within the scope of the following claims are possible and will occur to those skilled in the art.

I claim:

1. A cultivating tool comprising opposed ends and upper, lower and intermediate portions extending longitudinally between said ends,
   (a) said lower portion comprising a cutting edge extending between said ends;
   (b) said intermediate portion extending between said upper and lower portions, said intermediate portion comprising:
      (i) a forward outer surface extending between said ends and concavely upwardly and forwardly from said lower portion to said upper portion; and,
      (ii) a rearward outer surface extending between said ends and concavely upwardly and rearwardly from said lower portion to said upper portion,
   said lower portion of said tool and said forward and rearward outer surfaces having a substantial breadth between said ends sized for grading a ground surface and for spreading broken up plant debris on said surface.

2. A cultivating tool as described in claim 1, further including means for coupling said tool to a support arm.

3. A cultivating tool as defined in claim 2, wherein said lower portion of said tool is releasably attachable to said intermediate portion of said tool.

4. A cultivating tool as defined in claim 1, wherein said lower portion of said tool is releasably attachable to said intermediate portion of said tool.

5. Cultivating apparatus comprising:
   (a) a support arm; and,
   (b) a cultivating tool releasably couplable to said support arm, said tool comprising opposed ends and upper, lower and intermediate portions extending longitudinally between said ends, said lower portion comprising a cutting edge extending between said ends, said intermediate portion extending between said upper and lower portions, said intermediate portion comprising:
      (i) a forward outer surface extending between said ends and concavely upwardly and forwardly from said lower portion to said upper portion; and
      (ii) a rearward outer surface extending between said ends and concavely upwardly and rearwardly from said lower portion to said upper portion,
   said lower portion of said tool and said forward and rearward outer surfaces having a substantial breadth between said ends sized for grading a ground surface and for spreading broken up plant debris on said surface.

6. Cultivating apparatus as defined in claim 5, wherein said lower portion of said tool is releasably attachable to said intermediate portion of said tool.

7. Cultivating apparatus comprising:
   (a) a vehicle;
   (b) a boom pivotally mounted to said vehicle and extending outwardly therefrom for pivotal movement about a first axis;
   (c) a stick extending
      (i) from a proximal end pivotally connected to an outward end of said boom for pivotal movement about a second axis extending substantially parallel to said first axis
      (ii) to a distal end of said stick;
   (d) a cultivating tool coupled to said distal end of said stick, said tool comprising opposed ends and upper, lower and intermediate portions extending longitudinally between said ends, said lower portion comprising a cutting edge extending between said ends, said intermediate portion extending between said upper and lower portions, said intermediate portion comprising:
      (i) a forward outer surface extending between said ends and concavely upwardly and forwardly from said lower portion to said upper portion; and,
      (ii) a rearward outer surface extending between said ends and concavely upwardly and rearwardly from said lower portion to said upper portion, said lower portion of said tool and said forward and rearward outer surfaces having a substantial breadth between said ends sized for grading a ground surface and for spreading broken up plant debris on said surface.

8. Cultivating apparatus as defined in claim 7, wherein said lower portion of said tool is releasably attachable to said intermediate portion of said tool.

9. Cultivating apparatus as defined in claim 7, wherein said tool extends from said stick substantially in line with said stick.

10. Cultivating apparatus as defined in claim 9, wherein said lower portion of said tool is releasably attachable to said intermediate portion of said tool.

11. Cultivating apparatus as defined in claim 7, wherein said tool is pivotally coupled to said distal end of said stick for pivotal movement about a third axis extending substantially parallel to said first and second axes, said cutting edge extending substantially parallel to said first, second and third axes.

12. Cultivating apparatus as defined in claim 11, wherein said lower portion of said tool is releasably attachable to said intermediate portion of said tool.

13. Cultivating apparatus as defined in claim 12, wherein said tool is pivotal about said third axis to a position where said tool extends from said stick substantially in line with said stick.

14. Cultivating apparatus as defined in claim 13, wherein said lower portion of said tool is releasably attachable to said intermediate portion of said tool.

* * * * *